United States Patent
Kincaid

(10) Patent No.: US 6,895,022 B1
(45) Date of Patent: May 17, 2005

(54) DISTRIBUTED ARCHITECTURE COMMUNICATION SYSTEM HAVING BUS VOLTAGE COMPENSATION

(75) Inventor: Kevin D. Kincaid, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 904 days.

(21) Appl. No.: 09/696,090

(22) Filed: Oct. 26, 2000

(51) Int. Cl.⁷ .................................................. H04J 1/00
(52) U.S. Cl. ...................................... 370/489; 340/661
(58) Field of Search ................................. 327/108, 109, 327/110, 111, 112; 701/36; 340/657, 660, 661, 662, 663, 425.1, 438, 3.1, 3.5, 3.51, 3.52, 3.53, 3.54; 370/419, 420, 421, 422, 423, 449, 450, 451, 464, 489

(56) References Cited

U.S. PATENT DOCUMENTS

| | | | |
|---|---|---|---|
| 5,899,949 A | 5/1999 | Kincaid | |
| 5,964,816 A | 10/1999 | Kincaid | |
| 6,046,511 A | 4/2000 | Kincaid | |
| 6,104,308 A | * 8/2000 | Wallace et al. | 340/3.1 |
| 6,188,314 B1 | * 2/2001 | Wallace et al. | 340/438 |
| 6,424,900 B2 | 7/2002 | Murray et al. | |
| 6,522,962 B2 | 2/2003 | Millsap et al. | |

* cited by examiner

*Primary Examiner*—Bob A. Phunkulh
(74) *Attorney, Agent, or Firm*—Stefan V. Chmielewski

(57) ABSTRACT

An improved distributed architecture system including multiple electronic modules that communicate with each other over a communication bus through concurrent modulation of bus current and bus voltage, wherein the bus voltage detected by a receiver in the remote module is compensated to ensure reliable reception of a voltage modulated bus communication despite the modulation of bus current by the remote module. A remote module is coupled to the communication bus via input resistors to provide resistive isolation from the bus in the event of a short circuit failure in the remote module, and a charge pump and current mirror circuit in the remote module produce a compensation voltage across a resistor coupling the receiver to the bus, with the compensation voltage substantially canceling the influence of bus current modulation on the received bus voltage.

5 Claims, 2 Drawing Sheets

DISTRIBUTED ARCHITECTURE COMMUNICATION SYSTEM HAVING BUS VOLTAGE COMPENSATION

TECHNICAL FIELD

This invention relates to a distributed architecture communication system, in which multiple remote electronic modules communicate with a central module via a communication bus, and more particularly to a compensation circuit that enables reliable current and voltage modulated bus communications with a remote module that is resistively isolated from the communication bus.

BACKGROUND OF THE INVENTION

In general, a distributed architecture system may be defined as a system comprising multiple electronic modules interconnected by a communication bus. The block diagram of FIG. 1 depicts an example of a distributed architecture system, as applied to an automotive supplemental restraint system (SRS). Referring to FIG. 1, the SRS 10 comprises a central control module 12, and a number of crash sensor modules 14, occupant sensor modules 15, and ignitor modules 16 located remote from the central module 12, but coupled in parallel to central module 12 via a communication bus 18 comprising wires 18a and 18b. In a typical mechanization, the central control module 12 collects and processes input data from the various crash sensor modules 14 and occupant sensor modules 15, signals selected ignitor modules 16 to deploy one or more supplemental restraints, and diagnoses the ignitor modules 16 for proper functionality. Inter-module communications to support these functions can be achieved by modulation of the bus voltage and/or bus current. In a particularly advantageous implementation, the bus wire 18b defines a reference potential, the central module 12 communicates with the remote modules 14–16 by modulating the voltage on bus wire 18a with respect to bus wire 18b, and the remote modules 14–16 communicate with the central module 12 by modulating the current in bus wire 18a: this permits concurrent central-to-remote and remote-to-central communications, effectively doubling the communication capability (bandwidth) of the bus 18. However, modulating the bus current produces un-intended modulation of the bus voltage due to bus resistance, particularly in systems where the remote modules are resistively coupled to the bus 18 to isolate the bus 18 from short circuit failures in the remote modules.

Possible solutions to the above-described problem include one or more of the following: maximizing the amplitude of voltage modulation, minimizing the amplitude of current modulation, and minimizing the remote module coupling resistance. However, increasing the amplitude of voltage modulation increases the radiated emissions; decreasing the amplitude of current modulation reduces signal-to-noise ratio and susceptibility to radiated emissions; and reducing the remote module coupling resistance degrades fault tolerance and increases transmitter power dissipation during short circuit conditions. Accordingly, what is needed is a distributed architecture system that enables reliable, high-bandwidth, and fault-tolerant inter-module bus communication without the aforementioned drawbacks.

SUMMARY OF THE INVENTION

The present invention is directed to an improved distributed architecture system including multiple remote electronic modules that communicate with each other over a communication bus through concurrent modulation of bus current and bus voltage, wherein the bus voltage detected by a receiver in a remote module is compensated to ensure reliable reception of a voltage modulated bus communication despite the modulation of bus current by the remote module.

In a preferred embodiment, at least some of the remote modules are coupled to the communication bus via input resistors to provide resistive isolation from the bus in the event of a short circuit failure in the remote module; and a charge pump and current mirror circuit in the remote module produce a compensation voltage across a resistor coupling the receiver to the bus, with the compensation voltage substantially canceling the influence of bus current modulation on the received bus voltage.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
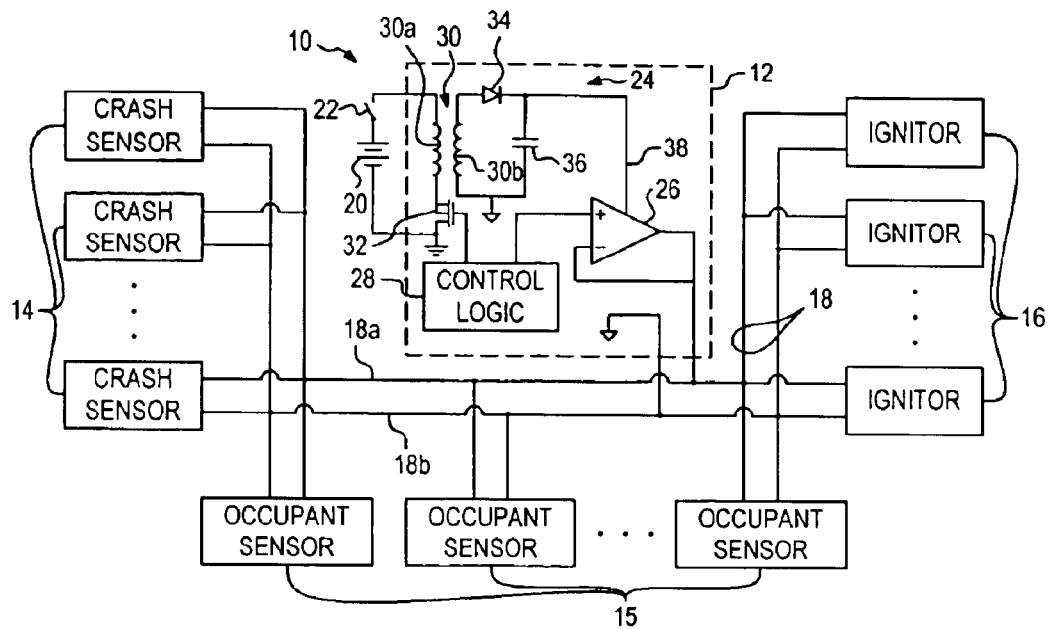
FIG. 1 is schematic diagram of an automotive supplemental restraint system having a central control module and multiple remote modules.

As briefly described above, FIG. 1 depicts a distributed architecture automotive supplemental restraint system (SRS) 10 comprising a central control module 12, and a number for crash sensor modules 14, occupant sensor modules 15, and ignitor modules 16 located remote from the central module 12, but coupled in parallel to central module 12 via a communication bus 18 comprising wires 18a and 18b. The central module 12 establishes a nominal bus voltage, and modulates the bus voltage to transmit messages to the remote modules 14–16. To this end, the central module 12 is coupled to the vehicle battery 20 via ignition switch 22, and includes a boost circuit 24, an amplifier 26, and a control logic unit 28. The boost circuit 24, which includes transformer 30, MOSFET 32, diode 34 and capacitor 36, develops an isolated voltage on line 38 that is provided as a source voltage for amplifier 26. The configuration and operation of boost circuit 24 will be well known: primary winding 30a of transformer 30 is coupled to battery 20 through ignition switch 22, battery current is intermittently supplied to winding 30a through MOSFET 32 under control of control logic unit 28, and energy stored in the secondary winding 30b at turn-off of MOSFET 32 charges capacitor 36 via diode 34. The bus wire 18a is coupled to the output of amplifier 26, while the bus wire 18b is coupled to an isolated ground reference as shown. The inverting input of amplifier 26 is coupled to the bus voltage on wire 18a, and the non-inverting input is coupled to a modulation signal output of control logic unit 28 for purposes of transmitting messages to remote modules 14–16 by bus voltage modulation.

Figure 2:
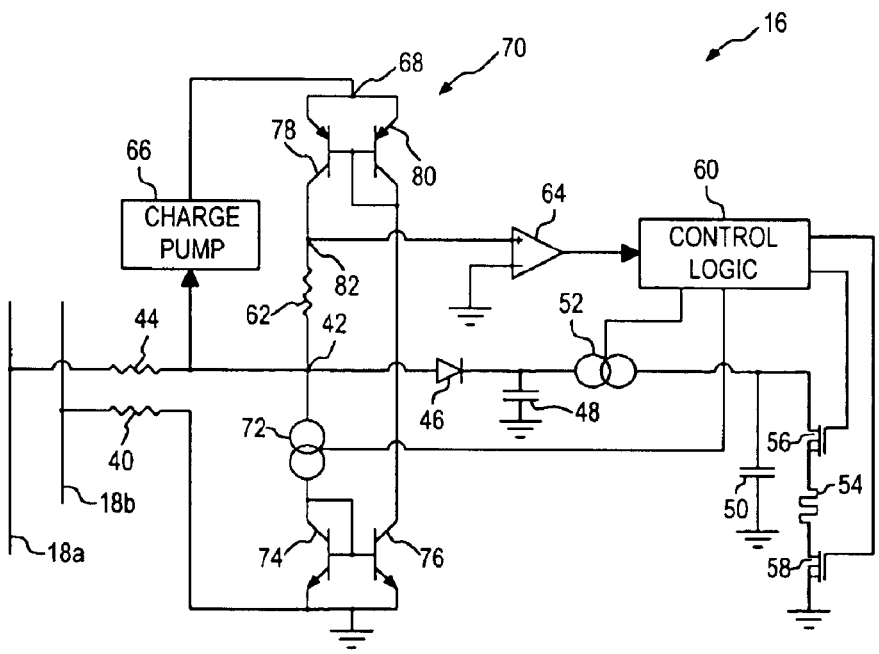
FIG. 2 is a circuit diagram depicting a remote module of the system depicted in FIG. 1, according to a preferred embodiment of this invention.

FIG. 2 depicts a remote ignitor module 16 that is resistively coupled to bus 18 for purposes of short circuit isolation. Thus, the bus wire 18b is coupled to the ignitor ground reference via resistor 40, and the bus wire 18a is coupled to an input node 42 via resistor 44. In the event of a ignitor module failure shorting the node 42 to the ignitor ground reference, the resistors 40, 44 effectively isolate the bus 18 from the short circuit, and bus communications between the central and the remaining remote modules 12–16 is maintained.

The ignitor module 16 is largely conventional, and includes a diode 46 and capacitor 48 for maintaining a supply voltage for the module, a squib 54, and a deployment capacitor 50 charged through current source 52 to maintain a reserve supply of energy for igniting the squib 54 when MOSFETs 56 and 58 are biased on to deploy a supplemental restraint. Bus communications from the central module 12 are received by receiver amplifier 64, which is coupled to input node 42 via resistor 62, and messages are transmitted to central module 12 by the current source 72 which is coupled between input node 42 and the ignitor ground reference to effect bus current modulation. A control logic unit 60 is responsive to the output of receiver amplifier 64, and controls the operation of current sources 52, 72 and MOSFETs 56, 58.

A problem that occurs with the above-described architecture and communications protocol in that modulation of the bus current by current source 72 also modulates the current in isolation resistors 40, 44, producing a corresponding modulation in the differential voltage detected by receiver amplifier 64 that can be misinterpreted as a message from the central module 12. In fact, the voltage drops across isolation resistors 40 and 44 are additive at the input of receiver amplifier 64, resulting in a perceived bus voltage differential of (2*Imod*R), where Imod is the bus modulation current through current source 72, and R is the resistance of each isolation resistor 40, 44. Although using large amplitude signals for voltage modulation, small amplitude signals for current modulation, or small isolation resistance values could mitigate the problem, each of these approaches has the disadvantage of introducing or exacerbating another problem, as indicated previously. The present invention, on the other hand, overcomes the problem without such disadvantages through the addition of voltage compensation circuitry in the remote module.

Figure 3:
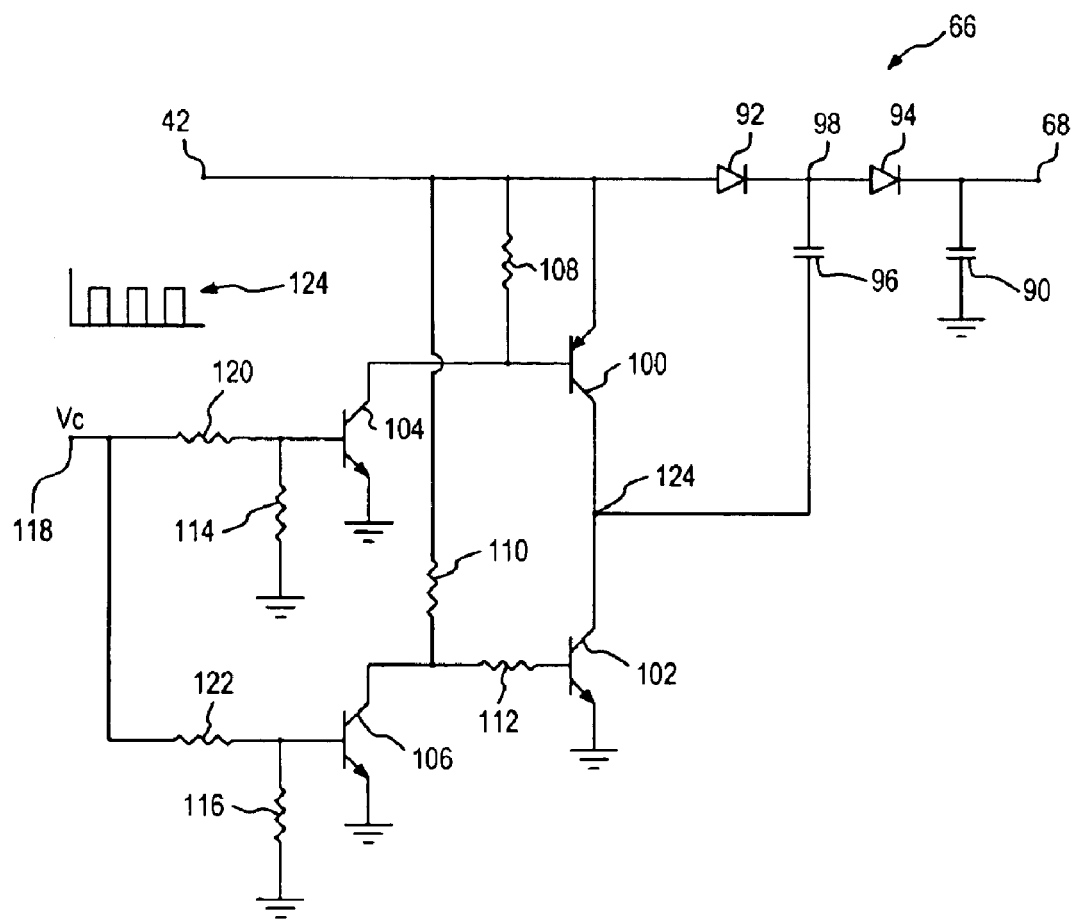
FIG. 3 is a circuit diagram of a charge pump block generally depicted in the diagram of FIG. 2.

Referring to FIG. 2, the voltage compensation circuitry includes a charge pump circuit 66 and a current mirror circuit 70. The charge pump 66 receives the bus voltage at node 42 and develops an elevated source voltage at node 68; the circuitry of charge pump 66 may be conventional, and a representative circuit design is depicted in FIG. 3. The current mirror circuit 70 is connected between node 68 and ground potential, and includes a first pair of transistors 74, 76 that conduct current in proportion to the current of current source 72, a second pair of transistors 78, 80 that conduct current in relation to the current in the collector-emitter circuit of transistor 76, and a compensation resistor 62 connected between input node 42 and the collector of transistor 78. The receiver amplifier input, which ordinarily would be connected to input node 42, is instead connected to the node 82 between compensation resistor 62 and transistor 78. The relative junction areas of the transistors 74, 76 and 78, 80 and the resistance of compensation resistor 62 are selected so that a small fraction of the modulation current passes through compensation resistor 62, producing a voltage between nodes 42 and 82 that exactly counteracts the bus voltage differential produced by the bus modulation current Imod.

In the illustrated embodiment, the junction areas of the transistors 74 and 76 are relatively sized so that $1/100^{th}$ of the current in the collector-emitter circuit of transistor 74 (that is, Imod/100) is mirrored in the collector-emitter circuit of transistor 76. On the other hand, the transistors 78 and 80 are matched so that Imod/100 is also mirrored in the emitter-collector circuit of transistor 78, and therefore, in compensation resistor 62. The compensation resistor 62 has a resistance of 200R (where R is the resistance of each isolation resistor 40, 44) so that the voltage across compensation resistor 62 during operation of current source 72 is (2*Imod*R), which is the same as the perceived bus voltage differential at node 42 due to the modulation current Imod. Thus, the current mirror circuit 70 conducts current through compensation resistor 62 when current source 72 is activated to modulate the bus current for communication purposes, and then only in an amount that exactly counteracts the bus voltage differential due to the modulation current Imod, so that the voltage at the input of receiver amplifier 64 is not influenced by the modulation current Imod. Of course, the isolation resistors 40, 44 may have different resistance values, and a different combination of compensation resistance (resistor 62) and relative transistor junction area may be utilized. In a general sense, the junction area ratio JAR ($1/100^{th}$, for example) of transistor pair 74, 76 is chosen to minimize the current sourced through compensation resistor 62, and the resistance R62 of resistor 62 is (Rt/JAR), where Rt is the total bus isolation resistance (i.e., the combined resistance of isolation resistors 40 and 44).

Referring to FIG. 3, the charge pump circuit 66 includes four switching transistors 100, 102, 104, 106, two isolation diodes 92, 94, and two capacitors 90, 96. A control voltage Vc at node 118 comprises a series of pulses as indicated by reference numeral 124, and controls the conduction of switching transistors 100, 102, 104, 106 to repeatedly transfer charge from capacitor 96 to capacitor 90, with the voltage at node 68 being determined by the voltage across capacitor 90. Initially, Vc is at a low potential; transistors 100, 104 and 106 are biased off due to the respective bias resistors 108, 114 and 116, and transistor 102 is biased on due to the bias resistor 110. In this state, capacitor 90 is charged nearly to the bus input voltage through diodes 92 and 94, and capacitor 96 is charged nearly to the bus input voltage through diode 92 and the collector-emitter circuit of transistor 102. When Vc assumes a high potential, transistors 104 and 106 are biased on through respective base resistors 120 and 122, biasing transistor 100 on and transistor 102 off. This raises the node 124 between transistors 100 and 102 substantially to the bus input voltage. As the voltage at node 98 rises above the bus input voltage, diode 92 becomes reverse biased, and the charge on capacitor 96 is transferred to capacitor 90. The process is repeated as Vc changes states again, eventually boosting the voltage at node 68 to twice the bus input voltage.

In summary, the circuitry of this invention compensates for changes in received bus voltage produced by bus current modulation, enabling reliable two-way bus communications based on both bus voltage and bus current modulation. While described in reference to the illustrated embodiment, it is expected that various modifications in addition to those mentioned above will occur to those skilled in the art. For example, a different charge pump circuit could be utilized, field effect transistors could be used in place of the illustrated bipolar transistors, and so on. Accordingly, it will be understood that circuits incorporating such modifications may fall within the scope of this invention, which is defined by the appended claims.

What is claimed is:

1. A distributed architecture system including multiple electronic modules that communicate with each other over a communication bus, including at least one electronic module that transmits messages over said communication bus by modulation of a bus current while receiving messages over said communication bus by de-modulation of a received bus voltage, the improvement comprising:

compensation circuitry responsive to the modulation of the bus current by said at least one electronic module for increasing said received bus voltage by an amount that counteracts decreases in said received bus voltage due to said modulation of bus current.

2. The improvement of claim 1, wherein:

said bus voltage is received by a receiver circuit of said at least one electronic module; and said compensation circuitry includes a compensation resistor coupled between said bus and said receiver circuit, and a current mirror circuit for supplying current to said compensation resistor in proportion to a modulation current drawn from said communication bus by the modulation of said bus current.

3. The improvement of claim 2, wherein said compensation circuitry further includes:

a charge pump coupled to said communication bus for developing an elevated voltage source for said current mirror circuit.

4. The improvement of claim 2, wherein:

said at least one electronic module is coupled to said communication bus via an input resistance; and said compensation resistor has a resistance determined in relation to said input resistance so that the current supplied to said compensation resistor creates a said compensation resistor has a resistance determined in relation to said input resistance so that the current supplied to said compensation resistor creates a voltage across said compensation resistor that matches a voltage across said input resistance due to the modulation of said bus current.

5. The improvement of claim 4, wherein:

said current mirror circuit supplies current to said compensation resistor based on a predetermined fraction JAR of said modulation current; and said compensation resistor has a resistance determined according to Rt/JAR, where Rt is said input resistance.

* * * * *